United States Patent
Dougan

(10) Patent No.: US 11,047,987 B2
(45) Date of Patent: Jun. 29, 2021

(54) METHOD, SYSTEM, AND COMPUTER PROGRAM PRODUCT FOR GNSS RECEIVER SIGNAL HEALTH AND SECURITY ANALYSIS

(71) Applicant: Finite State Machines Labs Inc., Austin, TX (US)

(72) Inventor: Cort Dougan, Austin, TX (US)

(73) Assignee: Finite State Machine Labs Inc., Austin, TX (US)

( * ) Notice: Subject to any disclaimer, the term of this patent is extended or adjusted under 35 U.S.C. 154(b) by 164 days.

(21) Appl. No.: 16/035,997

(22) Filed: Jul. 16, 2018

(65) Prior Publication Data
US 2018/0329070 A1 Nov. 15, 2018

Related U.S. Application Data

(63) Continuation of application No. 15/156,725, filed on May 17, 2016, now Pat. No. 10,024,975.
(Continued)

(51) Int. Cl.
*G01S 19/23* (2010.01)
*G01S 19/03* (2010.01)
(Continued)

(52) U.S. Cl.
CPC ............ *G01S 19/23* (2013.01); *G01S 19/015* (2013.01); *G01S 19/03* (2013.01); *G01S 19/215* (2013.01)

(58) Field of Classification Search
CPC ........ G01S 19/03; G01S 19/015; G01S 19/21; G01S 19/23; G01S 19/215
(Continued)

(56) References Cited

U.S. PATENT DOCUMENTS 6,501,421 B1 * 12/2002 Dutta ................. G06F 16/9537
342/357.22
9,466,881 B1 * 10/2016 Berry ...................... G01S 19/03
(Continued)

FOREIGN PATENT DOCUMENTS

CN         101915930 A      12/2010

OTHER PUBLICATIONS

International Search Report and the Written Opinion of the International Searching Authority, issued in corresponding International Application No. PCT/US2016/33258, dated Aug. 19, 2016, 12 pages.
(Continued)

*Primary Examiner* — Erin F Heard
*Assistant Examiner* — Michael W Justice
(74) *Attorney, Agent, or Firm* — Foley & Lardner LLP

(57) ABSTRACT

Methods, systems, and computer program products are provided for analyzing a Global Navigation Satellite System (GNSS) receiver. The method includes receiving electronic diagnostic information from the GNSS receiver, the diagnostic information including observations at different times of signal strength of one or more satellites at each point in a visible sky. The method includes building a flat map of the visible sky including a track of the one or more satellites. The method includes calculating, for each point in the visible sky of the flat map, an aggregated signal strength of the one or more satellites over a predetermined interval. The method includes generating a heat map over the flat map of the visible sky and displaying a visualization of a flat heat map.

11 Claims, 11 Drawing Sheets

Related U.S. Application Data

(60) Provisional application No. 62/164,418, filed on May 20, 2015.

(51) Int. Cl.
    *G01S 19/21* (2010.01)
    *G01S 19/01* (2010.01)

(58) Field of Classification Search
    USPC .................................. 342/357.59, 357.63
    See application file for complete search history.

(56) References Cited

U.S. PATENT DOCUMENTS

| | | | |
|---|---|---|---|
| 2009/0243914 A1 | 10/2009 | Song et al. | |
| 2011/0103432 A1 | 5/2011 | Tangudu | |
| 2012/0209519 A1 | 8/2012 | Basnayake | |
| 2013/0157605 A1* | 6/2013 | Dickman | G01S 19/215 455/296 |
| 2013/0217358 A1* | 8/2013 | Snider | H04W 12/1202 455/411 |
| 2013/0285849 A1 | 10/2013 | Ben-Moshe | |
| 2014/0253371 A1 | 9/2014 | Chen | |
| 2014/0354475 A1 | 12/2014 | Subburaj | |
| 2015/0116145 A1 | 4/2015 | Ashjaee | |
| 2015/0133173 A1 | 5/2015 | Edge et al. | |
| 2015/0226857 A1* | 8/2015 | Davies | G01S 19/215 342/357.59 |
| 2015/0226858 A1* | 8/2015 | Leibner | H04K 3/90 342/357.59 |
| 2015/0293234 A1* | 10/2015 | Snyder | H04K 3/65 342/357.59 |
| 2015/0312774 A1* | 10/2015 | Lau | H04W 24/10 455/446 |
| 2015/0373567 A1* | 12/2015 | Kish | H04W 4/029 370/252 |
| 2016/0154113 A1* | 6/2016 | Leibner | G01S 19/215 342/357.59 |

OTHER PUBLICATIONS

"Creating a Signal Strength Heatmap with an RTL-SDR," available at http://www.rtl-sdr.com/creating-signal-strength-heatmap-rtl-sdr/ (Sep. 25, 2014), 2 pages.

"GSM heatmap using RTL-SDR" comments, available at http://www.reddit.com/r/RTLSDR/comments/2hbjyt/gsm_heatmap_using_rtlsdr/ (Sep. 24, 2014), 3 pages.

Li, X, et al., "Precise positioning with current multi-constellation Global Navigation Satellite Systems: GPS, GLONASS, Galileo and BeiDou," Scientific Reports, 5, Article No. 8328 doi:10.1038/srep08328 (Feb. 9, 2015), available at http://www.nature.com/srep/2015/150209/srep08328/full/srep08328.html, pp. 1-14.

Supplementary European Search Report for EP 16797296.7 dated Dec. 14, 2018, 19 pages.

Irish, A. T., et al., "Probabilistic 3D mapping based on GNSS SNR Measurements," 2014 IEEE International Conference on Acoustic, Speech and Signal Processing (ICASSP), 2014, pp. 2390-2394.

Australian Examination Report dated Oct. 31, 2019, issued in Australian Patent Application No. 2016264465,3 pages.

\* cited by examiner

METHOD, SYSTEM, AND COMPUTER PROGRAM PRODUCT FOR GNSS RECEIVER SIGNAL HEALTH AND SECURITY ANALYSIS

PRIORITY CLAIM AND CROSS-REFERENCE TO RELATED APPLICATIONS

The present application is a continuation of application Ser. No. 15/156,725, filed May 17, 2016, now U.S. Pat. No. 10,024,975, issued Jul. 17, 2018, and which claims priority to U.S. Provisional Patent Application Ser. No. 62/164,418, filed May 20, 2015. The disclosures of which are incorporated herein in their entirety by reference.

TECHNICAL FIELD

Aspects of this disclosure relate to the monitoring and analysis of the health and security of Global Navigation Satellite System (GNSS) receivers.

BACKGROUND

Global Navigation Satellite System (GNSS) receivers are electronic devices that receive and digitally process signals transmitted by satellites to, for example, estimate time and position data. Stationary receivers are primarily used to obtain precise time while mobile receivers often also calculate geospatial location of the receiver. Data produced by these receivers is often of critical importance in business operations, logistics, navigation, robotics, and other applications.

However, signals from GNSS, such as from the United States Global Positioning System (GPS), may be weak and can be blocked or compromised accidently or on purpose. For example, adding a new GPS antenna to a rooftop over a data center could produce interference that would partially or even completely interfere with operation of other antennas. Injection of false information into the satellite signal is also a danger. Researchers have demonstrated that it is possible to receive and then retransmit modified GPS signals in order to change the time or position information on a GPS receiver.

GNSS satellites may transmit messages encoding time and orbital information that receivers may digitally receive and process in order to calculate receiver position and precise time. In view of the fragility of these receivers and the critical nature of their operation, some methods have been proposed to monitor and detect problems.

Heat maps and azimuth or elevation maps may be used to depict which satellites are visible at a given instance in time using "current state" data. For example, FIG. 1 depicts an azimuth/elevation chart of GPS satellite positions.

FIG. 1 is a typical flat satellite azimuth/elevation map. It gives "current state" data about which satellites are currently visible or have been visible over some period of data collection. An azimuth/elevation map may depict the four cardinal directions (e.g., North "N," South "S," East "E," West "W") with circles at different coordinates in the map that indicate the positions of one or more satellites in a visible sky. However, the current state information in the map of FIG. 1 may be only of limited use because it does not show any information about satellite obstructions, only the current state of visible satellites.

FIG. 2 depicts a heat map for visualizing satellite signal strength. A heat map may refer generally to any graphical representation of data where the individual values contained in a matrix may be represented as colors or by grayscale. In FIG. 2, the regions marked by lines spaced farther apart may indicate, for example, a higher satellite signal strength, whereas the regions marked by lines spaced closer together or cross hatched may indicate, for example, a lower satellite signal strength. FIG. 2 depicts a heat map for visualizing signal strength that is overlaid over a geophysical map. Various techniques for collecting current state signal strength data and building a heat-map correlated to a geophysical map are known to those skilled in the art, as shown in FIG. 2.

FIG. 2 is from an existing open source radio project that takes data that is output from a Register-transfer level chipset (e.g., RTL2832U) Software Defined Radio (RTL-SDR) Scanner (e.g., a program that collects signal strength data over any desired bandwidth) and at the same time records GPS coordinates using an external GPS receiver. See "Creating a Signal Strength Heatmap with an RTL-SDR," available at http://www.rtl-sdr.com/creating-signal-strength-heatmap-rtl-sdr/(Sep. 25, 2014), and "GSM heatmap using RTL-SDR" comments, available at http://www.reddit.com/r/RTLSDR/comments/2hbjyt/gsm_heatmap_using_rtlsdr/ (Sep. 24, 2014). Additionally, a paper in Science Reports, Xingxing Li et al., "Precise positioning with current multi-constellation Global Navigation Satellite Systems: GPS, GLONASS, Galileo and BeiDou *Scientific Reports* 5, Article number: 8328 doi:10.1038/srep08328 (Feb. 9, 2015), available at http://www.nature.com/srep/2015/150209/srep08328/full/srep08328.html ("Li"), which is hereby incorporated herein by reference in its entirety, describes some standard data collection and analysis methods applied to GPS systems.

FIG. 3 depicts a time series of GPS satellite positions, taken from Li. FIGS. 4A and 4B depict a signal-to-noise ratio of different satellite systems and orbital types at the GMSD station (Japan), taken from Li. FIGS. 3 and 4A-B depict both the satellite tracks of visible satellites and the signal strength information being collected over time. However, since each point may correspond to signals from multiple satellites with configurations changing over time, there is no straightforward or optimal way to see whether there are obstructions from this data or to detect spoofing that could change signal strength over some spatial region.

SUMMARY

Accordingly, there exists a need in the art to correlate the satellite tracks of visible satellites and the signal strength information being collected over time in order to develop a flat map showing signal strength at points in the sky. Exemplary embodiments disclosed herein use a novel combination of data analysis techniques to provide robust and actionable signal health and security analysis of GNSS receivers. In exemplary embodiments, two or more levels of combined time series data may be used to replace the simple "current state" data in existing GNSS monitoring systems, and the time series data may then be used to provide diagnostics.

Diagnostic information can be retrieved from most receivers, and the diagnostic information may contain, for each visible satellite, the time, position (altitude and azimuth) and signal strength of the last or some number of recent messages digitally received at the receiver from the visible satellites.

According to one aspect, a computer-implemented method for analyzing a Global Navigation Satellite System (GNSS) receiver is provided. The method includes the steps of: receiving, by the computer, electronic diagnostic information from the GNSS receiver, the diagnostic information including a plurality of observations at different times of signal strength of one or more satellites at each point in a visible sky; building, by the computer, a flat map of the visible sky using the received diagnostic information, wherein the flat map includes a track of the one or more satellites; calculating, by the computer, for each point in the visible sky of the flat map, an aggregated signal strength of the one or more satellites over a predetermined interval using the received diagnostic information; generating, by the computer, a heat map over the flat map of the visible sky and the calculated aggregated signal strengths; displaying, by the computer, a visualization of a flat heat map on a graphical user interface of a display device, the flat heat map including the generated heat map over the flat map of the visible sky; and, storing, by the computer, the diagnostic information and the flat heat map in an observation database.

In some embodiments, the method further includes: analyzing, by the computer, the aggregated signal strengths of the one or more satellites in the flat heat map to detect one or more problems with the GNSS receiver; and, generating, by the computer, an alert if the one or more problems are detected in the flat heat map.

In further embodiments, the method includes: determining, by the computer, whether one or more conditions are present in the flat heat map, the conditions including: the clear signal areas in the flat heat map are too small; there are significant occlusions in the flat heat map; there are strong signals coming from areas where satellite signals would be unlikely or impossible in the flat heat map; and there are areas of signal strength in the flat heat map that are too uniform.

In other embodiments, the method includes: generating, by the computer, a time series of a plurality of flat heat maps, the plurality of flat heat maps including the generated flat heat map and one or more stored heat maps in the observation database; analyzing, by the computer, the time series of flat heat maps to detect one or more problems with the GNSS receiver; and generating, by the computer, an alert if the one or more problems are detected in the time series of flat heat maps.

In further embodiments, the method includes determining, by the computer, whether one or more conditions are present in the time series of flat heat maps, the conditions including: the time series of heat maps indicates a sudden increase or decrease in region signal strength, there are new or removed blocked regions in the time series of flat heat maps, and a plurality of areas of signal strength change by a uniform amount in the time series of flat heat maps.

In other embodiments, the method includes: associating, by the computer, the points in the visible sky of the flat heat map with a geophysical mapping database and, displaying, by the computer, the visualization of the flat heat map overlaid on a geophysical mapping database on the display device.

In further embodiments, the method includes: validating, by the computer, a quality of one or more radio signals from one or more GNSS satellites based on the diagnostic information and the flat heat map; and, detecting, by the computer, a problem with the one or more radio signals based on the validating. In some embodiments, the method includes triggering, by the computer, a failover operation in response to detecting a problem with the one or more radio signals. In some embodiments, the failover operation is one or more of: switching from a stream from the one or more GNSS satellites to an alternative GNSS satellite stream, validating a safety system, and replacing positioning, time, or a combination of positioning and time information from the one or more GNSS satellites with synthetic information.

In another aspect, a system for analyzing a Global Navigation Satellite System (GNSS) receiver is provided. The system includes an observation database in electronic communication with a network, a GNSS receiver analysis computer including a processor, a data storage unit, a network interface, and a display device in electronic communication with the network. The processor is configured to cause the server to perform the following steps: receive, over the network, electronic diagnostic information from the GNSS receiver, the diagnostic information including a plurality of observations at different times of signal strength of one or more satellites at each point in a visible sky; build a flat map of the visible sky using the received diagnostic information, wherein the flat map includes a track of the one or more satellites; calculate, for each point in the visible sky, an aggregated signal strength of the one or more satellites over a predetermined interval using the received diagnostic information; generate a heat map over the flat map of the visible sky and the calculated aggregated signal strengths; display a visualization of a flat heat map on a graphical user interface of the display device, the flat heat map including the generated heat map over the flat map of the visible sky; and store the diagnostic information and the flat heat map in the observation database.

In some embodiments, the processor is configured to cause the server to perform the additional steps of: analyze the aggregated signal strengths of the one or more satellites in the flat heat map to detect one or more problems with the GNSS receiver; and generate an alert if the one or more problems are detected in the flat heat map.

In further embodiments, the analyzing includes: determine whether one or more conditions are present in the flat heat map, the conditions including: the clear signal areas in the flat heat map are too small; there are significant occlusions in the flat heat map; there are strong signals coming from areas where satellite signals would be unlikely or impossible in the flat heat map, and there are areas of signal strength in the flat heat map that are too uniform.

In other embodiments, the processor is configured to cause the server to perform the additional steps of: generate a time series of a plurality of flat heat maps, the plurality of flat heat maps including the generated flat heat map and one or more stored flat heat maps in the observation database; analyze the time series of flat heat maps to detect one or more problems with the GNSS receiver; and generate an alert if the one or more problems are detected in the time series of flat heat maps.

In further embodiments, the processor is configured to cause the server to perform the additional step of: determine whether one or more conditions are present in the time series of flat heat maps, the conditions including: the time series of flat heat maps indicates a sudden increase or decrease in region signal strength, there are new or removed blocked regions in the time series of flat heat maps, and a plurality of areas of signal strength change by a uniform amount in the time series of flat heat maps.

In yet other embodiments, the processor is configured to cause the server to perform the additional steps of: associate the points in the visible sky of the flat heat map with a geophysical mapping database; and display, by the computer, the visualization of the flat heat map overlaid on a geophysical mapping database on the display device.

According to another aspect, a non-transitory computer readable medium storing computer readable program code executable by a processor of a computer system for analyzing a Global Navigation Satellite System (GNSS) receiver is provided. The computer readable program code executable by the processor causing the computer system to perform the steps of: receive electronic diagnostic information from the GNSS receiver, the diagnostic information including a plurality of observations at different times of signal strength of one or more satellites at each point in a visible sky; build a flat map of the visible sky using the received diagnostic information, wherein the flat map includes a track of the one or more satellites; calculate, for each point in the visible sky, an aggregated signal strength of the one or more satellites over a predetermined interval using the received diagnostic information; generate a heat map over the flat map of the visible sky and the calculated aggregated signal strengths; display a visualization of a flat heat map on a graphical user interface of a display device of the computer system, the flat heat map including the generated heat map over the flat map of the visible sky; and store the diagnostic information and the flat heat map in an observation database.

In some embodiments, the non-transitory computer readable medium causes the computer system to perform the steps of: analyze the aggregated signal strengths of the one or more satellites in the flat heat map to detect one or more problems with the GNSS receiver; and, generate an alert if the one or more problems are detected in the flat heat map.

In a further embodiment, the non-transitory computer readable medium causes the computer system to perform the steps of: determine whether one or more conditions are present in the flat heat map, the conditions including: the clear signal areas in the flat heat map are too small; there are significant occlusions in the flat heat map; there are strong signals coming from areas where satellite signals would be unlikely or impossible in the flat heat map; and there are areas of signal strength in the flat heat map that are too uniform.

In other embodiments, the non-transitory computer readable medium causes the computer system to perform the steps of: generate a time series of a plurality of flat heat maps, the plurality of flat heat maps including the generated flat heat map and one or more stored heat maps in the observation database; analyze the time series of flat heat maps to detect one or more problems with the GNSS receiver; and generate an alert if the one or more problems are detected in the time series of flat heat maps.

In a further embodiment, the non-transitory computer readable medium causes the computer system to perform the steps of: determine whether one or more conditions are present in the time series of flat heat maps, the conditions including: the time series of heat maps indicates a sudden increase or decrease in region signal strength, there are new or removed blocked regions in the time series of flat heat maps, and a plurality of areas of signal strength change by a uniform amount in the time series of flat heat maps.

In an additional embodiment, the non-transitory computer readable medium causes the computer system to perform the steps of: associate the points in the visible sky of the flat heat map with a geophysical mapping database and, display the visualization of the flat heat map overlaid on a geophysical mapping database on the display device.

In another aspect, a computer-implemented method for improving the reliability of a computer that performs time sensitive or time stamped data processing is provided. The method includes: receiving, by the computer, electronic diagnostic information from a Global Navigation Satellite System (GNSS) receiver, said diagnostic information including a plurality of observations at different times of signal strength of one or more satellites at each point in a visible sky; building, by the computer, a flat map of the visible sky using the received diagnostic information, wherein the flat map includes a track of the one or more satellites; calculating, by the computer, for each point in the visible sky of the flat map, an aggregated signal strength of the one or more satellites over a predetermined interval using the received diagnostic information; generating, by the computer, a heat map over the flat map of the visible sky and the calculated aggregated signal strengths; validating, by the computer, a quality of one or more radio signals from one or more GNSS satellites based on the diagnostic information and the flat heat map; and, synchronizing, by the computer, one or more system clocks to reference time carried by the one or more GNSS satellites based on the validating.

In some embodiments, the one or more system clocks are implemented on a network clock device that provides reference time to one or more client or slave computers over a computer network.

In another aspect, a computer-implemented method for improving the reliability of a system that distributes reference time information over a computer network is provided. The method includes: receiving, by the system, electronic diagnostic information from a Global Navigation Satellite System (GNSS) receiver, said diagnostic information including a plurality of observations at different times of signal strength of one or more satellites at each point in a visible sky; building, by the system, a flat map of the visible sky using the received diagnostic information, wherein the flat map includes a track of the one or more satellites; calculating, by the system, for each point in the visible sky of the flat map, an aggregated signal strength of the one or more satellites over a predetermined interval using the received diagnostic information; generating, by the system, a heat map over the flat map of the visible sky and the calculated aggregated signal strengths; transmitting, by the system, the flat heat map, the diagnostic information, or a combination of the flat heat map and the diagnostic information, over the network to one or more networked computers to permit the networked computers to determine whether the system is receiving reference time carried by one or more GNSS satellites in a reliable manner.

In another aspect, a computer-implemented method for validating and monitoring the performance of one or more Global Navigation Satellite System (GNSS) receivers is provided. The method includes: receiving, by a computer, electronic diagnostic information, said diagnostic information including a plurality of observations at different times of signal strength of one or more satellites at each point in a visible sky; receiving, by the computer, a flat heat map, wherein the flat heat map is based on the electronic diagnostic information and comprises: a combination of a heat map of aggregate signal strength of the one or more satellites over a predetermined interval, and a flat map of one or more tracks of the one or more satellites; and, validating, by the computer, a quality of reference time data carried by one or more radio signals from one or more GNSS satellites based on the diagnostic information and the flat heat map.

BRIEF DESCRIPTION OF THE DRAWINGS

The accompanying drawings, which are incorporated herein and form part of the specification, illustrate various embodiments of the present disclosure and, together with the description, further serve to explain the principles of the disclosed systems and methods and to enable a person skilled in the pertinent art to make and use those systems and methods. In the drawings, like reference numbers indicate identical or functionally similar elements.

DETAILED DESCRIPTION

Figure 1:
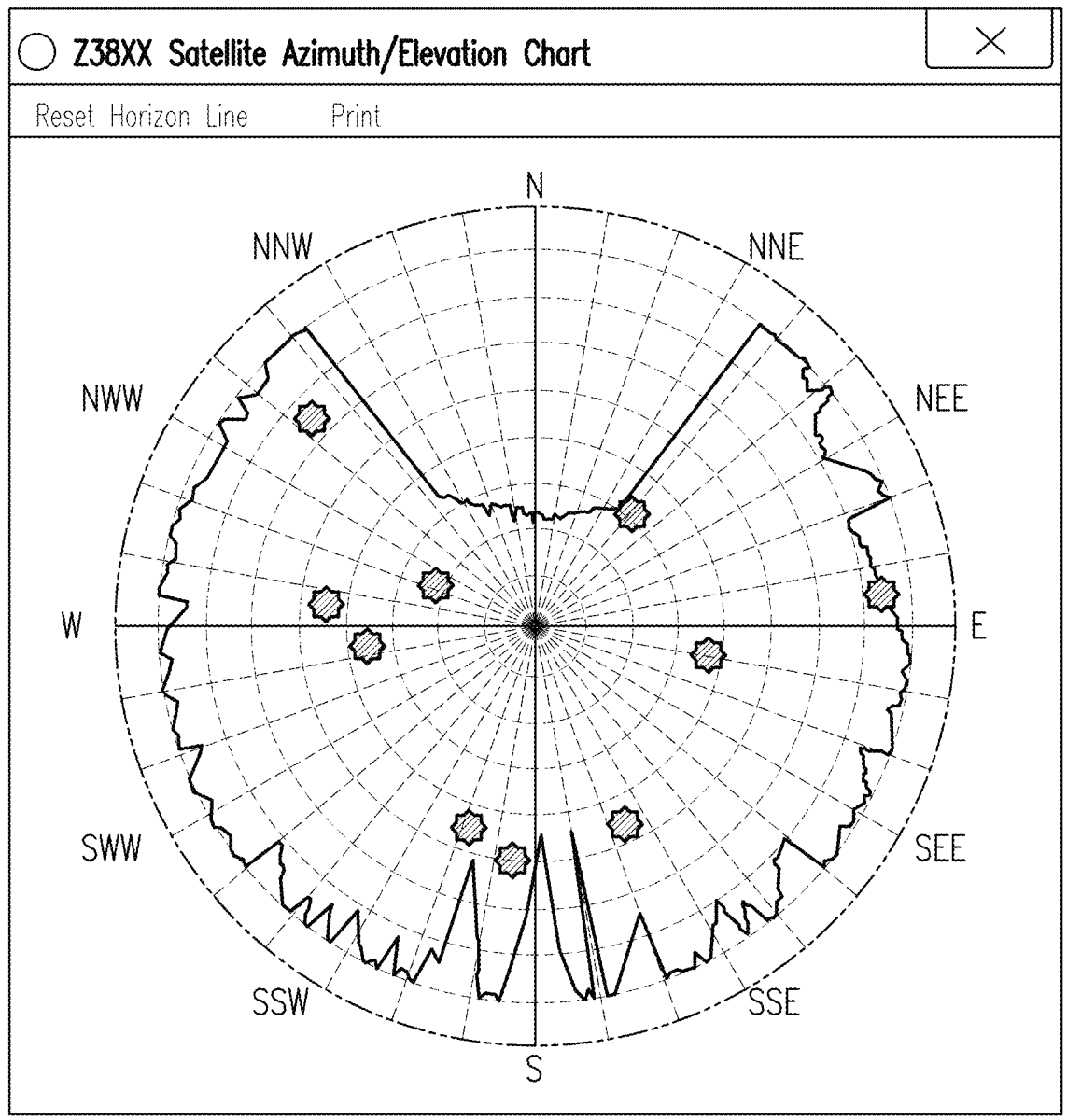
FIG. 1 depicts an azimuth/elevation chart of GPS satellite positions.
Figure 2:
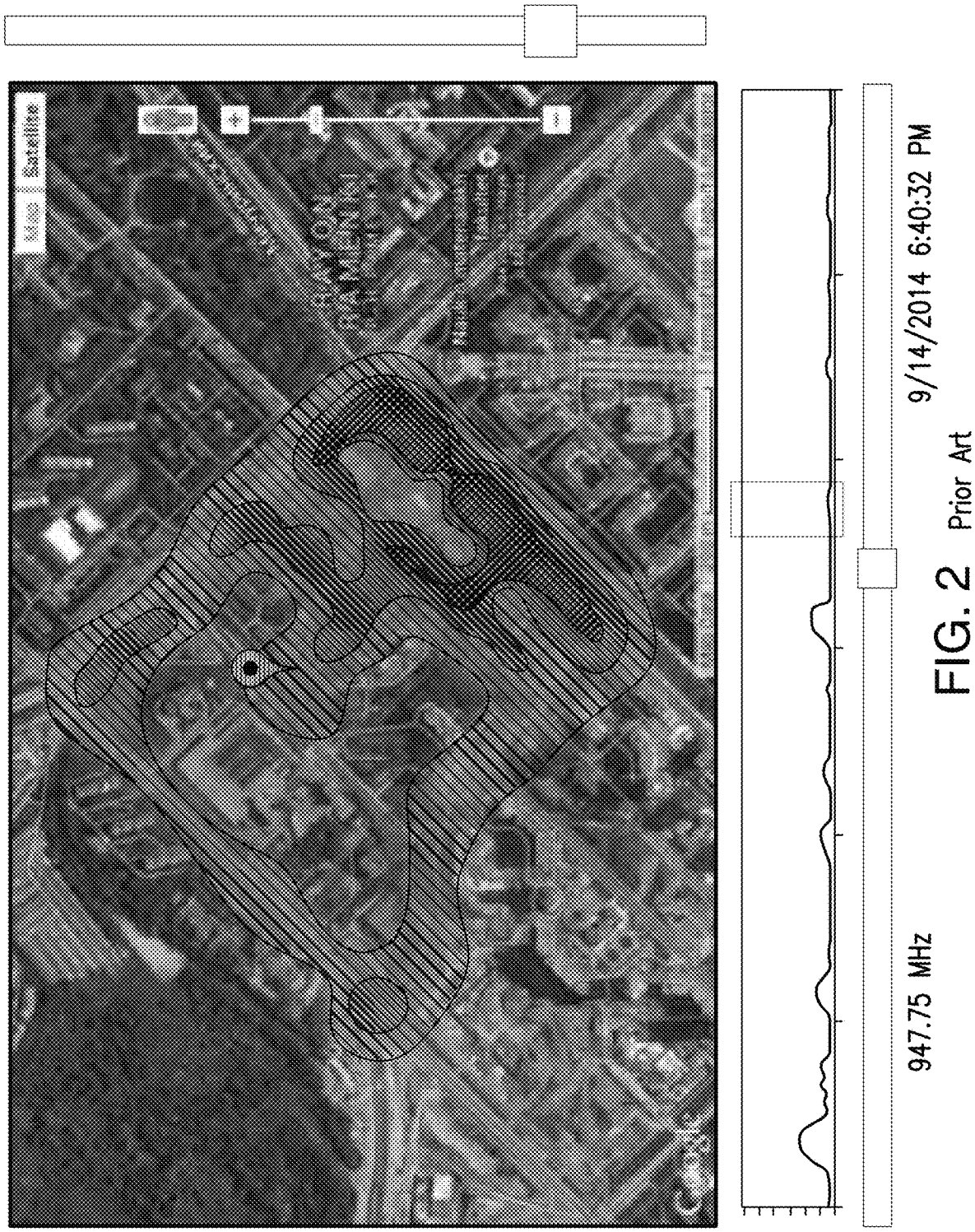
FIG. 2 depicts a heat map for visualizing satellite signal strength.
Figure 3:
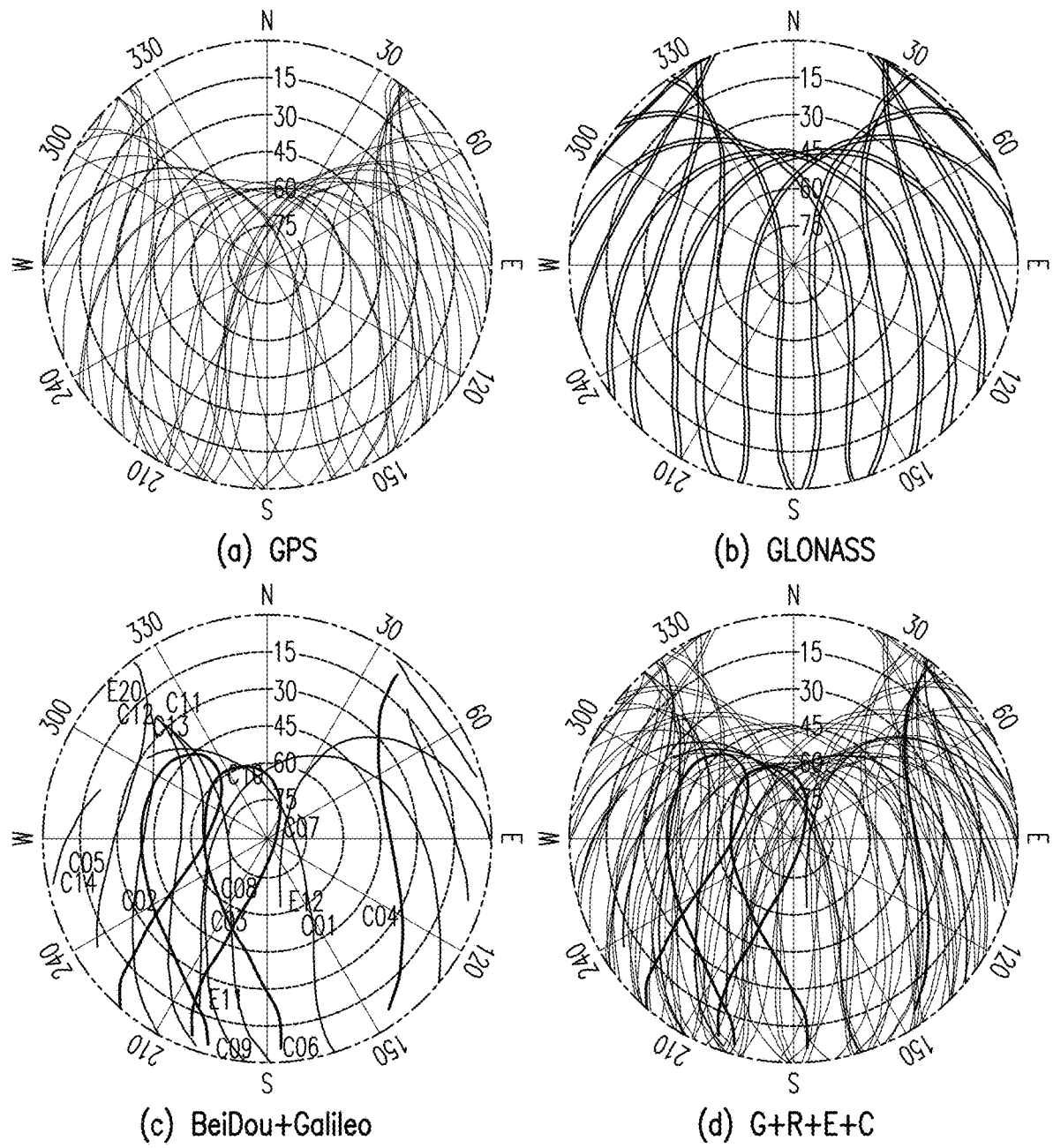
FIG. 3 depicts a time series of GPS satellite positions.
Figure 4A:
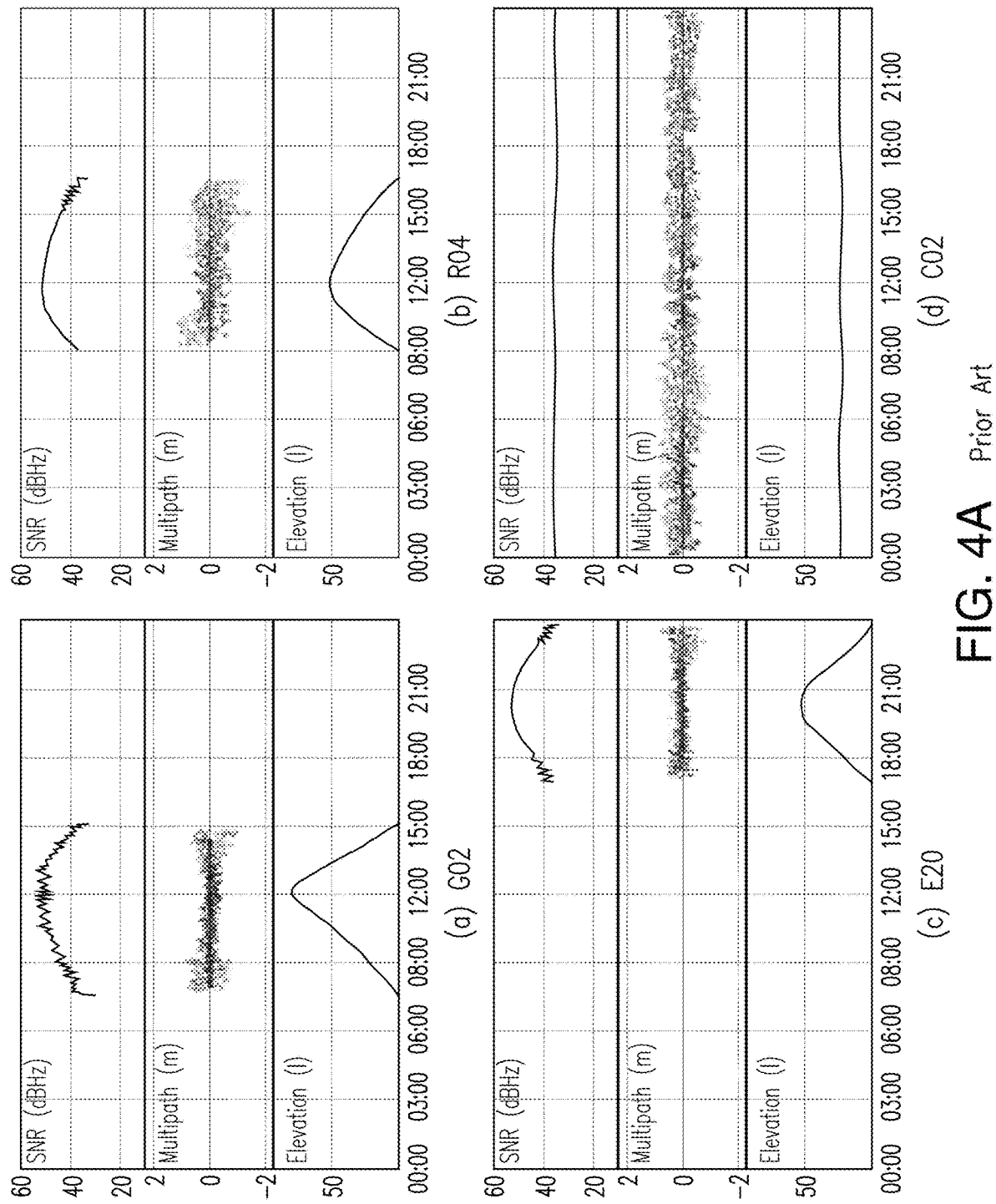
FIG. 4A depicts a signal-to-noise ratio of different satellite systems and orbital types at GMSD.
Figure 4B:
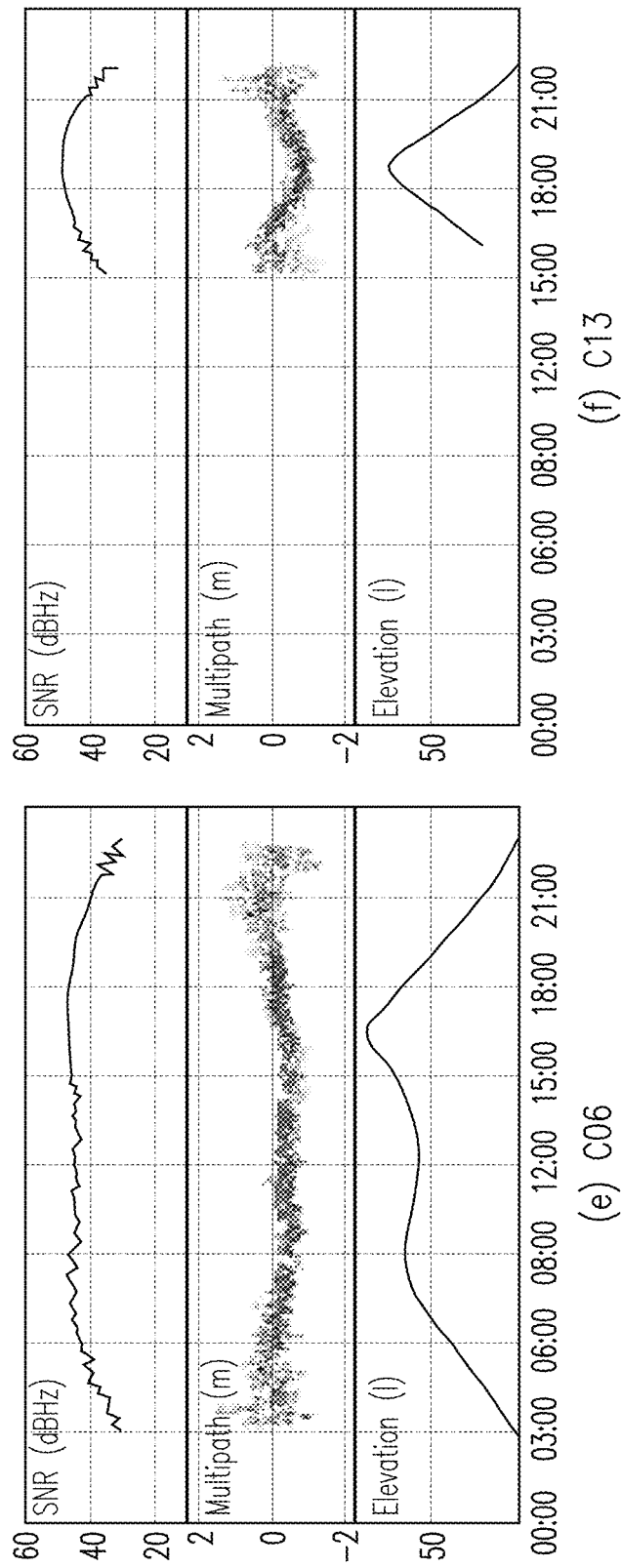
FIG. 4B depicts a signal-to-noise ratio of different satellite systems and orbital types at GMSD.
Figure 5:
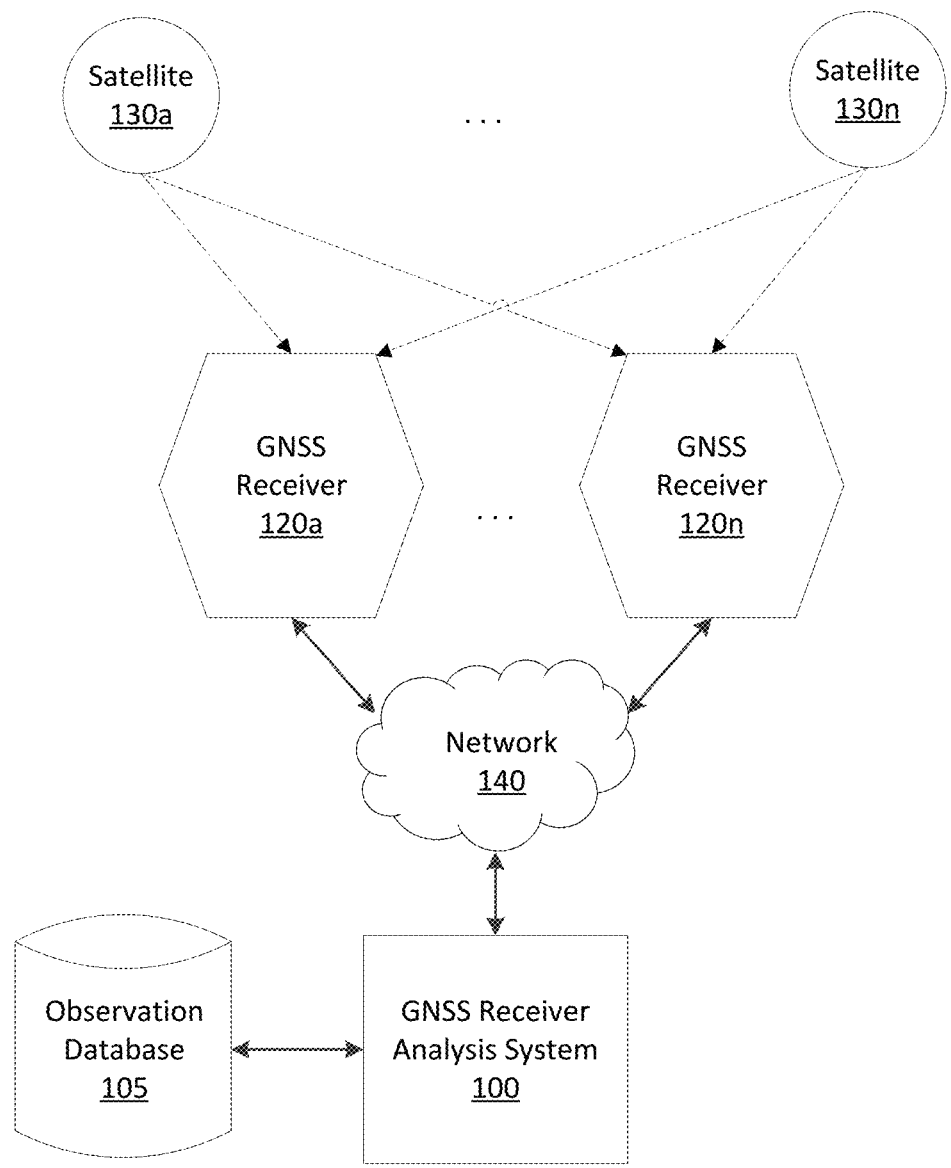
FIG. 5 is a schematic diagram of a receiver analysis system, according to exemplary embodiments of the present invention.

FIG. 5 depicts a schematic diagram of a GNSS receiver analysis system. As shown in FIG. 5, one or more GNSS receivers 120a-n may process signals broadcasted by one or more satellites 130a-n from space. In some embodiments, satellites 130a-n may comprise one or more global navigation satellite systems, such as, for example, NAVSTAR Global Positioning System (GPS), Galileo, BeiDou, and GLObal Navigation Satellite System ("GLONASS"). Since the satellites 130a-n are constantly in motion, the GNSS receiver 120 may continuously acquire and track the signals from the satellites 130a-n. For example, several GNSS systems (satellites 130 and receivers 120) may use Code Division Multiple Access (CDMA) or Frequency Division Multiple Access (FDMA) technology known in the art to transmit and process several satellite signals.

The GNSS receiver 120 may comprise an antenna system for receiving and digitizing signals from satellites 130a-n and a digital system for processing the received digital signals. In some embodiments, the digital system of GNSS receiver 120 may comprise a processor configured to convert the received signals from satellites 130a-n into position, velocity, and time estimates. Available techniques for converting such information are known to those skilled in the art. The GNSS receiver 120 may further comprise a non-transitory data storage unit for recording observation data associated with received signals from satellites 130a-n. For example, in response to receiving and processing a signal from a satellite 130a, the GNSS receiver 120 may store, in the data storage unit, observation data that includes the identity of the satellite 130a, the strength of the signal received from the satellite 130a, and the time, position, and velocity estimates.

The GNSS receiver's 120 position, velocity, and time estimates may be affected by noise and errors with the signals from satellites 130a-n due to, for example, the propagation of signals through atmospheric layers and noise measurements. The digital system of the GNSS receiver 120 may measure the signal strength of the different satellites 130a-n it is tracking, for example, by calculating the signal to noise ratio (SNR) or the carrier to noise ratio (CNR or C/N) of a received signal.

A GNSS Receiver Analysis System 100 may periodically query the GNSS receiver 120 for diagnostic information. The diagnostic information may comprise output messages from the GNSS receiver 120, the output messages comprising the observation data of satellites 130a-n, including the time, position, velocity, and signal strength estimates. For example, the diagnostic information may be retrieved using one or more serial ports of a GNSS receiver. In some embodiments, the diagnostic information may comprise, for example, standard messages, according to, for example, the National Marine Electronics Association ("NMEA") standards (e.g., NMEA-0183). NMEA format messages may comprise the position, velocity, and time information computed by GNSS receiver 120, as well as position, number of satellites in view, elevation, azimuth, etc. In embodiments where the GNSS receiver 120 is connected to a network 140, such as a cellular network or Internet network, the GNSS receiver analysis system may query the GNSS receiver 120 over the network 140 for diagnostic information. In some embodiments, diagnostic information from GNSS receiver 120 may be transmitted wirelessly over network 140, or via a cable, such as an Ethernet cable. In other embodiments where the GNSS receiver 120 is not connected to a network 140, the GNSS receiver 120 may be in electronic communication with GNSS receiver analysis system 100 through a direct hardwire connection via a serial port on the GNSS receiver 120.

In some embodiments, GNSS receiver analysis system 100 may further comprise an observation database 105 for storing diagnostic information or output messages queried from GNSS receiver 120. In some embodiments, observation database 105 may be in the same housing as GNSS receiver analysis system 100, and in other embodiments, observation database 105 may be in separate housing from the GNSS receiver analysis system 100 and may be in electronic communication with the GNSS receiver analysis system 100 through a hardwire connection, a local wireless connection, or via network 140.

Figure 6:
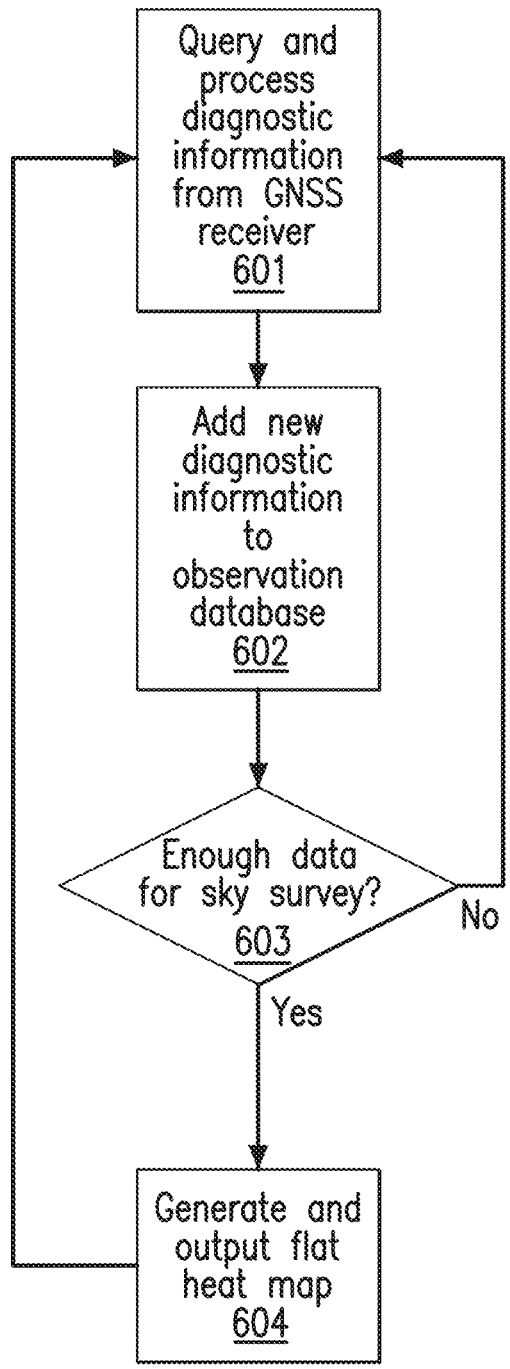
FIG. 6 is a flow diagram of a method for generating a flat map and heat map of satellite signal strength, according to exemplary embodiments of the present invention.

FIG. 6 depicts a flow diagram of a method for generating a flat map and heat map of satellite signal strength, according to some embodiments. In preferred embodiments, method 600 is performed by GNSS receiver analysis system 100.

At step 601, the GNSS receiver analysis system 100 may periodically query the GNSS receiver 120 for diagnostic information. The diagnostic information may comprise, for example, output messages from the GNSS receiver 120, including observation data of one or more satellites 130a-n, such as signal strength and estimated time and position data.

At step 602, the GNSS receiver analysis system 100 may add the new diagnostic information to observation database 105.

At step 603, the GNSS receiver analysis system 100 determines if there is enough data in the observation database 105 to generate a sky survey, or flat heat map. In some embodiments, the GNSS receiver analysis system 100 may determine there is enough data if observation data over a pre-determined time interval is present in the observation database 105. In some embodiments, the pre-determined time interval may be very short, such as a few minutes, and in other embodiments, the pre-determined time interval may span several hours, days, weeks, or months. As described in detail below, the time interval may be determined based on the desired analysis of the diagnostic information. If there is insufficient data for a sky survey, as determined in step 603, then the GNSS receiver analysis system 100 will return to step 601 to query and process diagnostic information from the GNSS receiver 120.

If there is sufficient data for a sky survey, as determined in step 603, then the GNSS receiver generates and outputs a flat heat map of the satellite observations over an interval of time in step 604. The flat map and heat map is generated based on a plurality of GNSS receiver messages, or diagnostic information, stored in observation database 105.

Figure 7:
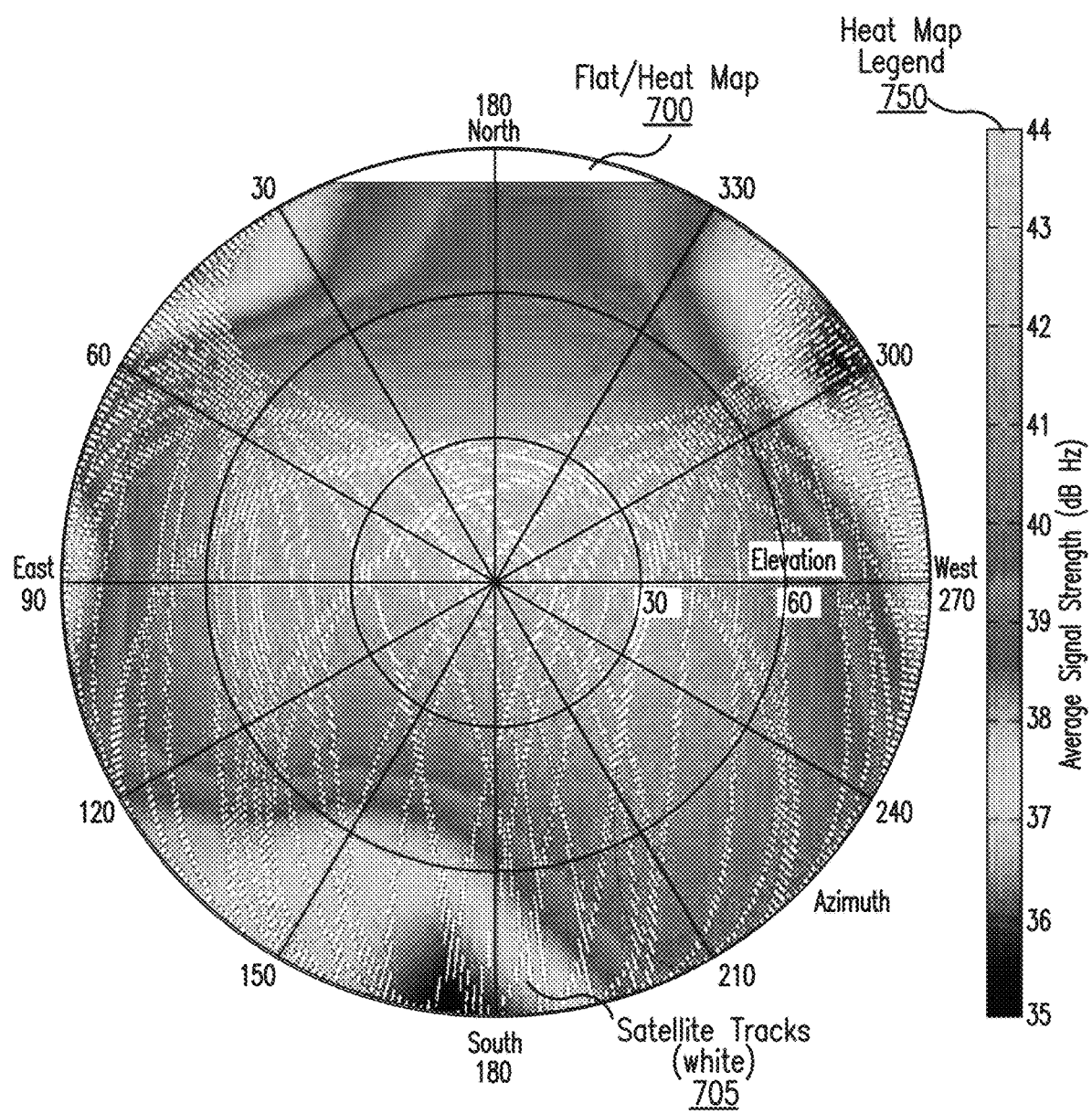
FIG. 7 depicts a flat map showing satellite tracks and a heat map of satellite signal strength, according to exemplary embodiments of the present invention.

FIG. 7 depicts a flat map showing satellite tracks and a heat map of satellite signal strength, according to some embodiments. In preferred embodiments, the flat map and heat map 700 of FIG. 7 may be generated by the GNSS receiver analysis system 100 using a plurality of GNSS receiver 100 messages, or diagnostic information, stored in observation database 105. The flat map 700 depicts portions of the visible sky, and may include, for example, the satellite tracks 705 of one or more satellites 130a-n tracked by GNSS receiver 120 across the visible sky over a predetermined time interval.

The flat map 700 further depicts a heat map indicating average signal strength of the one or more satellites 130a-n over the predetermined time interval. For ease of reference, FIG. 7 includes a heat map legend 750 indicating average signal strength (dB Hz) over a predetermined interval. As depicted in the heat map legend 750, areas in the heat map 700 of the visible sky with weaker signal strength (e.g., 35 dB Hz) are indicated by a darker color (e.g., black), whereas areas in the heat map 700 of the visible with stronger signal strength (e.g., 44 dB Hz) are indicated by a different or lighter color (e.g., gray). In some embodiments, the GNSS receiver analysis system 100 may perform a statistical aggregation technique (for example, averaging) to calculate an aggregate signal strength of one or more satellites' 130a-n signals over a pre-determined time interval using the plurality of GNSS receiver messages, or diagnostic information, stored in the observation database 105.

The heat map 700 may identify signal strength in regions of the sky and may further be used to diagnose obstructions, interference, and other issues, as described below. As shown in FIG. 7, the GNSS receiver analysis system 100 may generate images of the heat/flat maps for display in a graphical user interface of a display device and store these images in observation database 105. In preferred embodiments, the flat map 700 includes time series data from repeated queries of GNSS receiver 120 diagnostic information so that the flat map 700 shows the paths or tracks 705 and signal strengths of all visible satellites 130a-n over a time interval.

Figure 8:
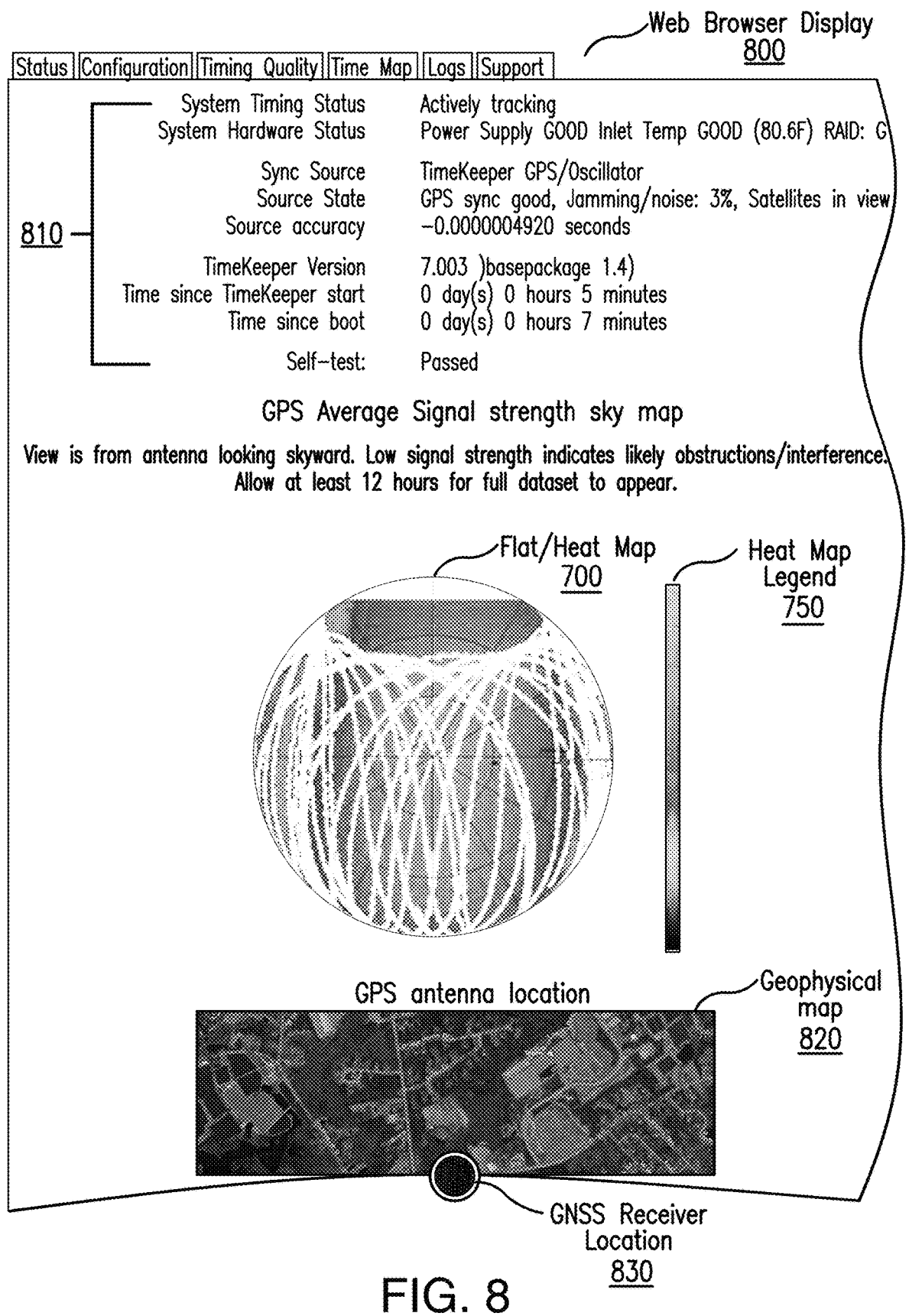
FIG. 8 is an illustrative workspace window depicting a web-browser view of a flat map and geophysical map, according to exemplary embodiments of the present invention.

FIG. 8 is an illustrative workspace window depicting a web-browser view of a flat map and geophysical map, according to some embodiments. Illustrative workspace window 800 comprises a web browser display that may be visualized on a graphical user interface of a computing device. In some embodiments, GNSS receiver analysis system 100 may comprise a computer, such as, for example, a computer server, with a network interface for transmitting and receiving messages over a network 140, such as the Internet. The GNSS receiver analysis system 100 may receive a request from a user, via the user's computing device (laptop, desktop, mobile device, tablet, etc.), over network 140 for diagnostic information regarding one or more GNSS receivers 120. In response to the request, the GNSS receiver analysis system 100 may transmit a response to the user's computing device comprising data to generate the illustrative workspace window 800 shown in FIG. 8. In some embodiments, a user may transmit the request to the GNSS receiver analysis system 100 using web browser technology known in the art.

The illustrative workspace window, or web browser display 800, may include one or more of a plurality of diagnostic information 810 regarding one or more GNSS receivers 120, a flat/heat map 700 with heat map legend 750, and a geophysical map 820. The diagnostic information 810 may include, for example, a timing status, hardware status, sync source, source state, and source accuracy of one or more GNSS receivers 120. The source state may comprise data indicating, for example, a jamming/noise percentage, the number of satellites 130 in view, the maximum signal strength of one or more satellites, etc., from the GNSS receiver 120. The illustrative workspace window may further comprise a heat map 700 and accompanying heat map legend 750 for the GNSS receiver 120 over a predetermined interval of time, as described above in connection with FIG. 7.

In some embodiments, the GNSS receiver analysis system 100 may associate the position information from observation database 105 with a geophysical mapping database (e.g., Google Maps®, Google Earth®). For example, FIG. 8 depicts a geophysical map 820 with an indication of the location of the GNSS receiver 830. Visualizing the flat map 700 with the geophysical map 820 may enable a user to associate problem conditions of the GNSS receiver 120 with physical and electronic features, such as the presence of a tall building or an air-conditioning unit.

Figure 9:
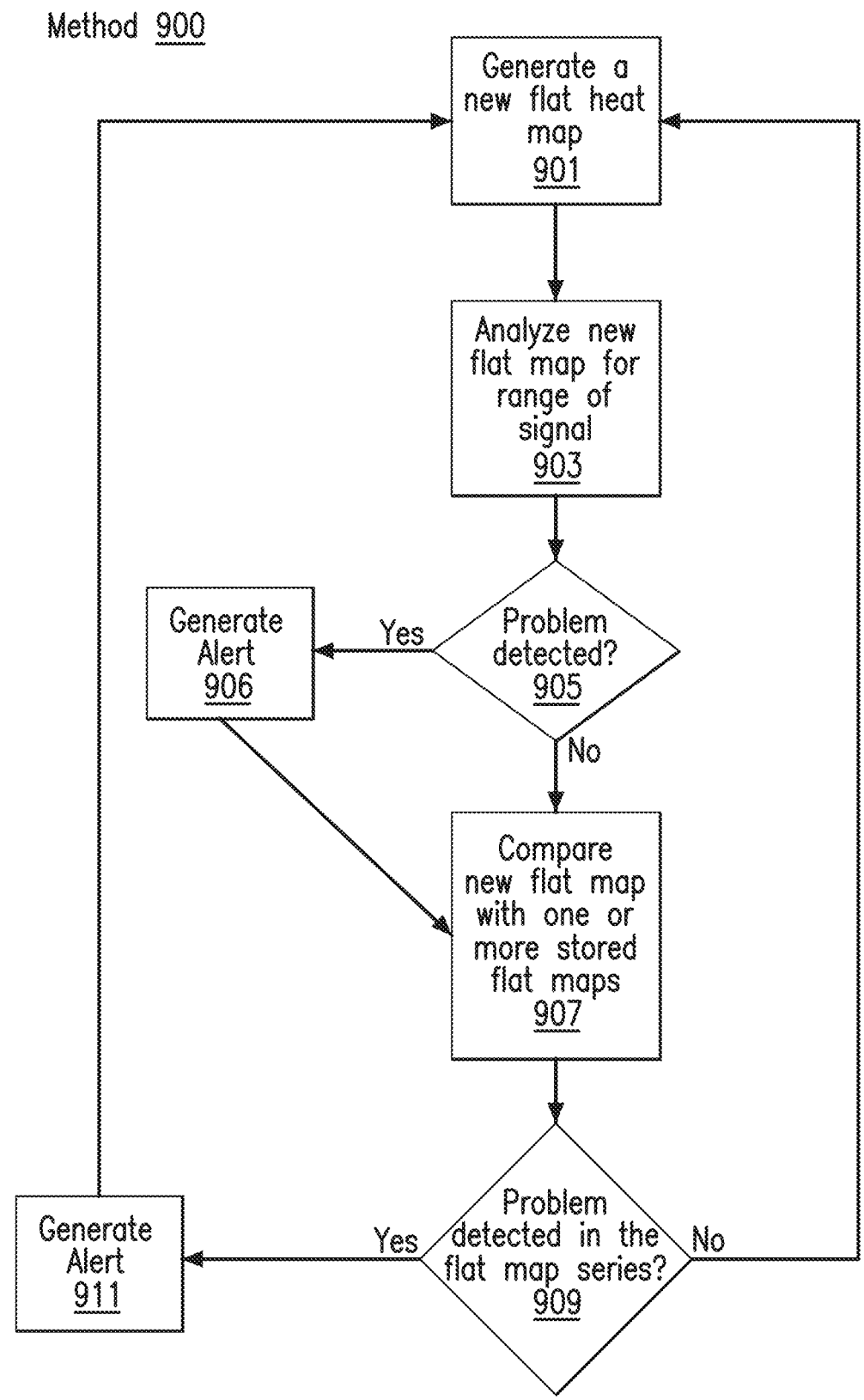
FIG. 9 is a flow diagram of a method for GNSS receiver signal health and security analysis, according to exemplary embodiments of the present invention.

FIG. 9 is a flow diagram of a method for GNSS receiver health and security analysis, according to some embodiments. Method 900 may be performed by the GNSS receiver analysis system 100 to detect health and/or security issues with a GNSS receiver 120.

In step 901, the GNSS receiver analysis system 100 generates a new flat heat map. In some embodiments, the GNSS receiver analysis system 100 may generate a new flat heat map as described above in connection with FIG. 6.

In step 903, the GNSS receiver analysis system 100 analyzes the new flat heat map for a range of signal. In step 905, the GNSS receiver analysis system 100 detects if there is a problem with the GNSS receiver 120 based on the analysis of the range of signal in step 903. In some embodiments, as part of the analysis in step 903, the GNSS receiver analysis system 100 may flag any conditions that would limit data accuracy, such as absence of sufficient regions of strong signal strength.

Several potential issues with a GNSS receiver 120 may be detected by analyzing the new heat map. For example, a problem may be detected if one or more of the following conditions are present: the clear signal areas in the heat map are too small; there are significant occlusions in the heat map; there are suspiciously strong signals coming from areas where satellite signals would be unlikely or impossible (e.g., the geophysical map database may indicate a structure that would block signal); and there are areas of signal strength in the heat map that are too uniform, which may indicate a synthetic or terrestrial signal. The above conditions are meant to be illustrative, and are not exhaustive. However, those skilled in the art will appreciate that the disclosed heat map analysis constitutes a significant improvement to GNSS receiver 120 issue detection since, for example, the heat maps provide a statistical average of GNSS receiver 120 messages over a time interval, rather than simple "current state" data.

For example, consider a situation where an unmanned aerial vehicle ("UAV") with a GNSS receiver 120 is maneuvering in a given area where it will frequently change attitude and altitude, thereby changing GPS signal strength for each satellite 130. By analyzing the observations in observation database 105 of the satellites 130a-n over the last X observations (or over Y minutes, e.g., a predetermined interval), it can be determined that the highest signal strength has been a given amount (typically measured in dB/Hz or signal/noise). However, if the new flat map shows that the aggregate signal strength value is exceeded by a certain amount for that satellite, or for a majority of satellites, then it can be assumed that the signal being received is not genuine but is being generated by a non-genuine GPS satellite in a spoof attempt. Additionally, it is possible to calibrate a given receiver/antenna configuration to establish an absolute upper bound on signal strength possible for any satellite in any part of the sky. If any satellite signal strength exceeds this value, as indicated on the flat map, it can be assumed that the signal is not genuine and is thereby a spoof attempt and must be ignored.

Additionally, the UAV may find the physical location of the source of the interference or spoofing by using directional information about the source of interference or spoofing and computing heat maps from different locations. For example, triangulation techniques using known locations of the heat maps may be used to find a physical location of a source of interference or spoofing. This same technique could be implemented by a multiplicity of UAVs each computing heat maps in different locations so that the multiple maps can be used to pinpoint the location of the source of interference or spoofing. The same technique can be employed by moving vehicles or even by stationary receivers by combining directional information from a number of maps. For example, GNSS receivers with antennas on rooftops, each producing flat heat maps will produce sufficient information to find a source of interference or spoofing that is affecting several of them if their locations have sufficient geometrical coverage. The source of interference or spoofing can be either stationary or moving.

If a problem is detected in step 905, then the GNSS receiver analysis system 100 may generate an alert 906. In some embodiments, the generated alert may comprise a message that is transmitted to one or more user devices, such as an email, text message, page, automated call, etc. In some embodiments, an alert may be displayed on the graphical workspace window depicted in FIG. 8, for example, as a notice or pop-up window.

If no problem is detected in step 905, then the GNSS receiver analysis system 100 compares a time series of a plurality of flat heat maps in step 907. For example, the GNSS receiver analysis system 100 may compare the new flat heat map obtained in step 901 from a more recent time interval with one or more flat heat maps from earlier time intervals that have been stored in observation database 105. In some embodiments, the GNSS receiver analysis system 100 may generate a time series of the plurality of heat maps for evaluation.

In step 909, the GNSS receiver analysis system 100 determines whether a problem has been detected using a time series of the flat maps. In instances where a static GNSS receiver 120 is being analyzed, a problem may be detected if one or more of the following conditions are satisfied: the time series of flat maps indicates a sudden increase or decrease in region signal strength (e.g., caused by deliberating interference or changes in visibility); there are new or removed blocked regions in the time series flat heat map; and areas of signal strength change by a uniform amount in the time series flat heat map.

Mobile GNSS receivers 120 may also be analyzed by the GNSS receiver analysis system 100. Mobile GNSS receivers 120 may experience frequent changes in signal strength from different satellites due to changes in altitude and position. Thus, it may be difficult to establish expected signal strength reception for areas of the sky since obstructions/interference relative to the receiver are not fixed. However, the GNSS receiver analysis system 100, in using time series data of signal strength via heat maps, may generate an upper limit on signal strength based on historical observations in observation database 105 of specific satellites 130 in a region of the sky. Thus, a problem may be detected if the observed signal strength in the time series heat map indicates it is within a specified margin of the upper limit on a signal strength or exceeds the specified margin. For example, if the time series of heat map indicates that observed signal strength is exceeded, the GNSS receiver analysis system 100 may determine that the signal is not being generated by the satellite 130 itself, but by an attempt to jam/spoof the satellite signal.

For example, one method for "spoofing" GPS is to have a spoofing device receive data from GPS satellites 130 so that it "knows" what satellites 130 are currently visible and their positions and times, and then transmit a stronger signal with modified messages that appear to be from the same satellites 130. The GNSS receiver 120 may then see continuity, but can be walked off of position. However, this spoofing process may produce an anomaly in the time series of flat maps showing contiguous regions of suddenly increased signal strength due to the transmission from the spoofing device. Thus, the GNSS receiver analysis system 100 may detect this anomaly and generate an appropriate alert.

In some embodiments, method 900 may further include a step of incorporating the use of a geophysical database to enhance information from the new flat map and/or the time series of flat maps (e.g., to show natural or man-made obstructions to satellite signals). Consider an example where a static flat map indicates that a GPS receiver 120 that was intermittently providing low quality time had only a small area of high quality signals and a dark (blocked) area to the north. The data from the flat map may be combined with geophysical data, which may indicate that a new building under construction to the north was producing a shadow, in order to better analyze the blocked area in the flat map.

If a problem with the flat heat map series is detected in step 909, then the GNSS receiver analysis system 100 may generate an alert in step 911 in a similar manner as described above in connection with step 906. However, if no problem is detected in step 909, then the GNSS receiver analysis system 100 may proceed back to step 901 for continued analysis.

There are numerous immediate applications for the disclosed heat maps and time series of heat maps, including, for example:

Financial Trading (time data): The systems, methods, and computer program products of the present invention could be deployed to provide precise time for enterprise computer systems used, for example, in financial trading where time stamp validity is required by regulation and is necessary for forensic trace and proper system functioning. Flat map data and time series of flat map data can be used both to trigger failover operations when a problem is detected (for example to switch from one GNSS stream to another one if a possible compromise is indicated by a flat map analysis on the first GNSS stream) and to build a validation chain so that time data can be associated with a health assessment on the GNSS information. This assessment can be supplemented with analysis of the derived data, e.g. whether the derived timing information maintains a constant frequency or whether indications of suspicious changes in the heat map coincide with or precede changes in frequency that could confirm suspicions of an attempt to compromise time quality.

In some embodiments, a computer system may utilize the flat map to validate and monitor the performance of one or more GNSS receivers 120. In some embodiments, the computer system may generate the flat map by obtaining the underlying reception information directly, and in others the computer system may obtain the flat map in some packet form by network communications with a second computer. For example, a dedicated GNSS receiver/network clock device 120 connected to a computer network may permit access via additional computer protocols (such as Secure Shell or Telnet) to query for signal information, and the computer system may use flat map information to validate the quality of time data being produced by the dedicated GNSS receiver/network clock.

Logistics (time and position data): The systems, methods, and computer program products of the present invention could be deployed to control logistics (e.g. to track movements and transport times of cargo containers or train cars or trucks). Flat map and time series of flat map data can be used to cross check position, to determine when failover is indicated, and to alert to diversion of goods or attempts to replace actual positioning information with synthetic information in an effort to conceal diversions.

Vehicle Operation (time and position data): GNSS systems are critical to operation of drones, human controlled aircraft, and other vehicles (including personal automobiles). Flat map data and Flat map time series data, in accordance with the systems, methods, and computer program products of the present invention, could be used to validate safety systems and to protect against diversion or sabotage of position and time data.

In some embodiments, the systems, methods, and computer program products of the present invention could be used to determine or find the source of an attempted compromise of a GNSS system.

Figure 10:
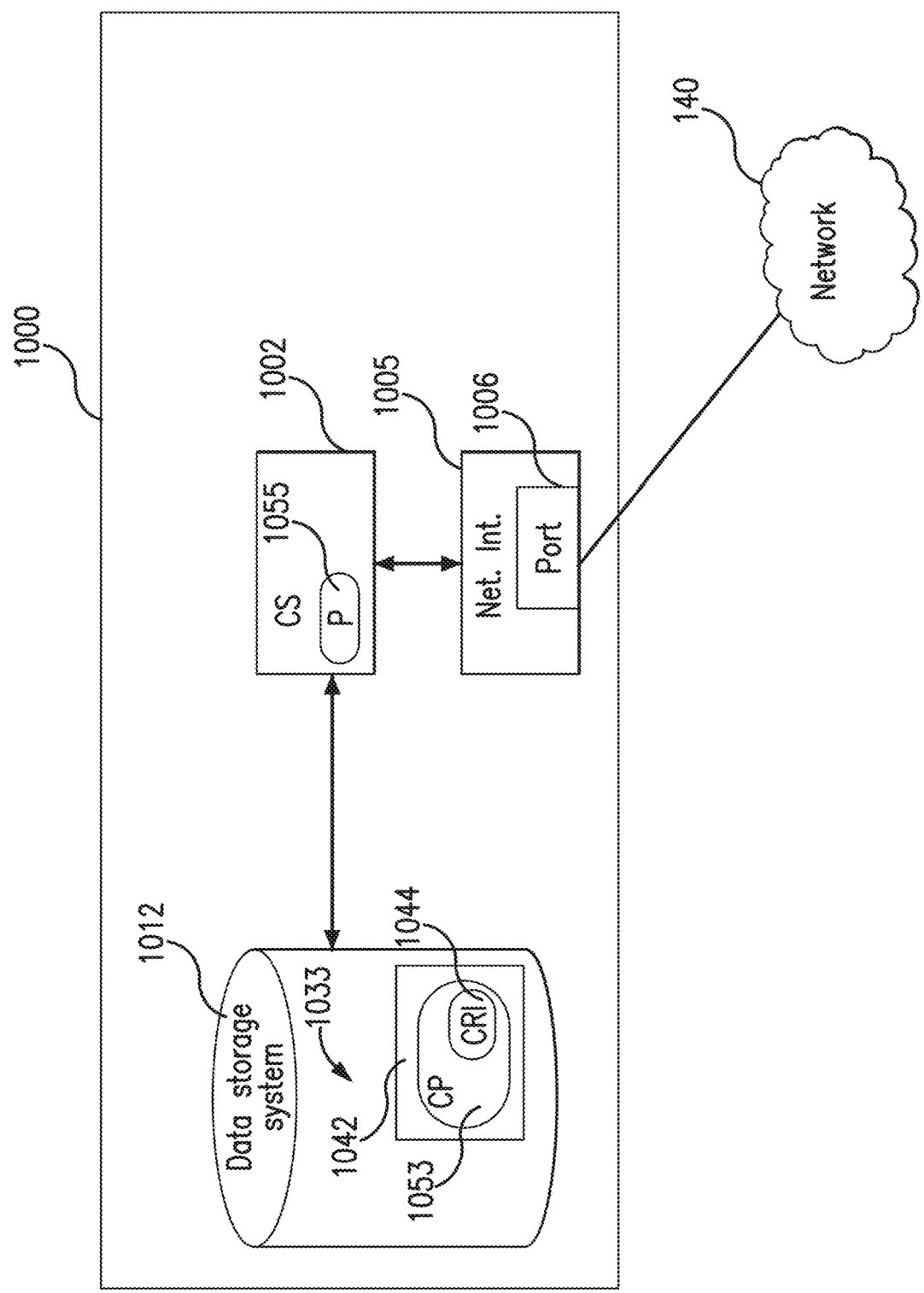
FIG. 10 is a schematic diagram illustrating a GNSS receiver analysis system, according to exemplary embodiments of the present invention.

FIG. 10 is a schematic diagram illustrating a possible implementation for at least some components of a GNSS receiver analysis system, according to some embodiments of the present invention. As shown in FIG. 10, GNSS receiver analysis system 1000 may comprise: a computer system (CS) 1002, which may include one or more processors 1055 (e.g., a microprocessor) and/or one or more circuits, such as an application specific integrated circuit (ASIC), field-programmable gate arrays (FPGAs), a logic circuit, and the like; a network interface 1005 for connecting GNSS receiver analysis system 1000 to network 140; and a data storage system 1012, which may include one or more non-volatile storage devices and/or one or more volatile storage devices (e.g., random access memory (RAM)).

In embodiments where GNSS receiver analysis system 1000 includes a processor 1055, a computer program product (CPP) 1033 may be provided. CPP 1033 includes or is a non-transitory computer readable medium (CRM) 1042 storing a computer program (CP) 1053 comprising computer readable instructions (CRI) 1044 for performing steps described herein (e.g., one or more of the steps shown in FIGS. 6 and 9). CP 1053 may include an operating system (OS) and/or one or more application programs. CRM 1042 may include a non-transitory computer readable medium, such as, but not limited, to magnetic media (e.g., a hard disk), optical media (e.g., a DVD), solid state devices (e.g., random access memory (RAM), flash memory), and the like.

In some embodiments, the CRI 1044 of computer program 1053 is configured such that when executed by computer system 1002, the CRI causes the system 1000 to perform steps described above (e.g., steps described above and below with reference to the flow charts shown in the drawings). In other embodiments, system 1000 may be configured to perform steps described herein without the need for a computer program. That is, for example, computer system 1002 may consist merely of one or more ASICs. Hence, the features of the embodiments described herein may be implemented in hardware and/or software.

While various embodiments of the present disclosure have been described above, it should be understood that they have been presented by way of example only, and not limitation. Thus, the breadth and scope of the present disclosure should not be limited by any of the above-described exemplary embodiments.

The invention claimed is:

1. A computer-implemented method for detecting a spoof attempt of a satellite signal, the method comprising:

receiving, by a computer, a first set of electronic diagnostic information from a Global Navigation Satellite System (GNSS) receiver, wherein the first set of electronic diagnostic information comprises time, position, and signal strength data of a satellite over a first period of time;

determining, by the computer, a first aggregate signal strength of the satellite over the first period of time based on the first set of electronic diagnostic information;

building, by the computer, a first flat map of the visible sky using the determined first aggregate signal strength of the satellite;

generating, by the computer, a first heat map over the first flat map of the visible sky using the determined first aggregate signal strength of the satellite;

receiving, by the computer, a second set of electronic diagnostic information from the GNSS receiver, wherein the second set of electronic diagnostic information comprises time, position, and signal strength data of the satellite over a second period of time, wherein the second period of time is different than the first period of time;

determining, by the computer, a second aggregate signal strength of the satellite over the second period of time based on the second set of electronic diagnostic information;

building, by the computer, a second flat map of the visible sky using the determined second aggregate signal strength of the satellite;

generating, by the computer, a second heat map over the second flat map of the visible sky using the determined second aggregate signal strength of the satellite;

comparing, by the computer, the first heat map over the first flat map and the second heat map over the second flat map; and detecting, by the computer, whether a signal received at the GNSS receiver is a spoof attempt or is generated by the satellite based on a variation between the first heat map over the first flat map and the second heat map over the second flat map.

2. The method of claim 1, wherein the detecting further comprises:
   determining, by the computer, that the signal received at the GNSS receiver is a spoof attempt when the variation between the first heat map over the first flat map and the second heat map over the second flat map exceeds a threshold.

3. The method of claim 1, further comprising:
   displaying, by the computer, a visualization of at least one of a first flat heat map or a second flat heat map on a graphical user interface of a display device, the first flat heat map comprising the generated first heat map over the first flat map of the visible sky and the second flat heat map comprising the generated second heat map over the second flat map of the visible sky.

4. The method of claim 1, further comprising:
   determining, by the computer, a physical location of a spoof attempt using at least one of the first flat heat map or the second flat heat map.

5. The method of claim 4, wherein the determining the physical location of the spoof attempt further comprises:
   associating, by the computer, one or more points in the visible sky of at least one of the first or second flat heat map with a geophysical mapping database.

6. The method of claim 1, wherein the detecting further comprises:
   determining, by the computer, that the variation between the first heat map over the first flat map and the second heat map over the second flat map indicates a signal received at the GNSS receiver has changed by a uniform amount; and
   determining, by the computer, that the signal received at the GNSS receiver is a spoof attempt.

7. A system for detecting a spoof attempt of a satellite signal comprising:
   a GNSS receiver analysis computer comprising a processor, a data storage unit, a network interface, and a display device in electronic communication with the network, wherein the processor is configured to cause the computer to:
   receive a first set of electronic diagnostic information from a Global Navigation Satellite System (GNSS) receiver, wherein the first set of electronic diagnostic information comprises time, position, and signal strength data of a satellite over a first period of time;
   determine a first aggregate signal strength of the satellite over the first period of time based on the first set of electronic diagnostic information;
   build a first flat map of the visible sky using the determined first aggregate signal strength of the satellite;
   generate a first heat map over the first flat map of the visible sky using the determined first aggregate signal strength of the satellite;
   receive a second set of electronic diagnostic information from the GNSS receiver, wherein the second set of electronic diagnostic information comprises time, position, and signal strength data of the satellite over a second period of time, wherein the second period of time is different than the first period of time;
   determine a second aggregate signal strength of the satellite over the second period of time based on the second set of electronic diagnostic information;
   build a second flat map of the visible sky using the determined second aggregate signal strength of the satellite;
   generate a second heat map over the second flat map of the visible sky using the determined second aggregate signal strength of the satellite;
   compare the first heat map over the first flat map and the second heat map over the second flat map; and
   detect whether a signal received at the GNSS receiver is a spoof attempt or is generated by the satellite based on a variation between the first heat map over the first flat map and the second heat map over the second flat map.

8. The system of claim 7, wherein the processor is further configured to cause the computer to:
   generate a heat map over the flat map of the visible sky using the determined first and second aggregate signal strengths of the satellite; and,
   display a visualization of at least one of a first flat heat map or a second flat heat map on a graphical user interface of the display device, the first flat heat map comprising the first generated heat map over the first flat map of the visible sky and the second flat heat map comprising the generated second heat map over the second flat map of the visible sky.

9. The system of claim 7, wherein the processor is further configured to cause the computer to:
   determine a physical location of a spoof attempt using at least one of the first flat heat map or the second flat heat map.

10. The system of claim 9, wherein the processor is further configured to cause the computer to:
    determine the physical location of the spoof attempt by associating one or more points in the visible sky of at least one of the first or second flat heat map with a geophysical mapping database.

11. A non-transitory computer readable medium storing instructions configured to cause a computer to perform the method of claim 1.

* * * * *